US012285804B2

(12) United States Patent
Liu et al.

(10) Patent No.: US 12,285,804 B2
(45) Date of Patent: Apr. 29, 2025

(54) METHOD TO PRODUCE AN ADDITIVELY MANUFACTURED, GRADED COMPOSITE TRANSITION JOINT

(71) Applicants: Carpenter Technology Corporation, Philadelphia, PA (US); UT-Battelle, LLC, Oak Ridge, TN (US); West Virginia University Board of Governors on behalf of West Virginia University, Morgantown, WV (US); General Electric Company, Schenectady, NY (US)

(72) Inventors: Xingbo Liu, Morgantown, WV (US); Zhili Feng, Knoxville, TN (US); Yanli Wang, Knoxville, TN (US); David Novotnak, Mcdonald, PA (US); Haiyang Qian, Avon, CT (US)

(73) Assignees: GE Infrastructure Technology LLC, Greenville, SC (US); UT Battelle, LLC, Oak Ridge, TN (US); West Virginia University Board of Governors on Behalf of West Virginia University, Morgantown, WV (US); Carpenter Technology Corporation, Philadelphia, PA (US)

( * ) Notice: Subject to any disclaimer, the term of this patent is extended or adjusted under 35 U.S.C. 154(b) by 219 days.

(21) Appl. No.: 18/000,622

(22) PCT Filed: Jun. 4, 2021

(86) PCT No.: PCT/US2021/035855
§ 371 (c)(1),
(2) Date: Dec. 2, 2022

(87) PCT Pub. No.: WO2021/247970
PCT Pub. Date: Dec. 9, 2021

(65) Prior Publication Data
US 2023/0211415 A1    Jul. 6, 2023

Related U.S. Application Data

(60) Provisional application No. 62/704,965, filed on Jun. 4, 2020.

(51) Int. Cl.
*B22F 7/06* (2006.01)
*B22F 7/00* (2006.01)
(Continued)

(52) U.S. Cl.
CPC .............. *B22F 7/062* (2013.01); *B22F 7/002* (2013.01); *B22F 10/28* (2021.01); *B22F 10/38* (2021.01);
(Continued)

(58) Field of Classification Search
None
See application file for complete search history.

(56) References Cited

U.S. PATENT DOCUMENTS

| 2009/0208773 A1* | 8/2009 | DuPont | B23K 20/00 228/101 |
| 2013/0121868 A1* | 5/2013 | Gandy | B22F 7/02 164/80 |

(Continued)

FOREIGN PATENT DOCUMENTS

| CN | 108326315 A | 7/2018 |
| CN | 111151880 A | 5/2020 |
| KR | 2020 0010628 A | 1/2020 |

OTHER PUBLICATIONS

Transmittal of International Preliminary Report on Patentability and Written Opinion mailed Dec. 15, 2022 for PCT/US2021/035855; pp. 10.

(Continued)

*Primary Examiner* — Xiaobei Wang
(74) *Attorney, Agent, or Firm* — James Pemrick; Charlotte Wilson; Hoffman Warnick LLC (57) ABSTRACT

A method for producing an additively manufactured, graded composite transition joint (AM-GCTJ) includes preparing a grating or lattice pattern from a first alloy A; the grating or lattice pattern includes pores in the grating or lattice patterns. The grating pattern is built from a first end to a second end being denser on the first end than on second end, and gradually reduces density by increasing the pore size and/or reducing density of the grating or lattice pattern; adding a second alloy B powder to the second end of grating or lattice (Continued)

pattern. The second alloy B powder is filled towards the first end. A composite is formed of first alloy A and second alloy B powder in the AM-GCTJ. The composite is subjected to hot isostatic pressing (HIP) to densify the composite. The second alloy B is graduated from the first end to the second end O of AM-GCTJ.

19 Claims, 5 Drawing Sheets

(51) Int. Cl.
- *B22F 10/28* (2021.01)
- *B22F 10/38* (2021.01)
- *B23K 35/22* (2006.01)
- *B33Y 10/00* (2015.01)
- *B33Y 80/00* (2015.01)

(52) U.S. Cl.
CPC .............. *B23K 35/22* (2013.01); *B33Y 10/00* (2014.12); *B33Y 80/00* (2014.12); *B22F 2207/01* (2013.01); *B22F 2301/35* (2013.01); *B22F 2998/10* (2013.01); *B22F 2999/00* (2013.01)

(56) References Cited

U.S. PATENT DOCUMENTS

| | | | |
|---|---|---|---|
| 2019/0151974 A1* | 5/2019 | Blank | B23K 20/24 |
| 2020/0131614 A1* | 4/2020 | Ota | F23R 3/002 |
| 2021/0291274 A1* | 9/2021 | Sercombe | B22F 10/14 |

OTHER PUBLICATIONS

Sridharan N, et al., "Design, Fabrication, and Characterization of Graded Transition Joints", Welding Journal, Aug. 1, 2017 (Aug. 1, 2017), pp. 295-306, XP055843414, Retrieved from the Internet: URL: https://www.osti.gov/pages/servlets/purl/1410953; [retrieved on Sep. 21, 2021]; p. 296-p. 297; figures 2, 5, 7 p. 300, right-hand column.

* cited by examiner

METHOD TO PRODUCE AN ADDITIVELY MANUFACTURED, GRADED COMPOSITE TRANSITION JOINT

This application claims priority from U.S. Provisional Application No. 62/704,965, filed Jun. 4, 2020. The entire contents of U.S. Provisional Patent Application Ser. No. 62/704,965 are incorporated by reference into this utility, non-provisional patent application.

STATEMENT REGARDING FEDERALLY SPONSORED RESEARCH

This invention was made with government support under Grant No. DE-FE0031819 and Grant No. DE-AC05-00OR22725 awarded by the Department of Energy. The government has certain rights in the invention.

TECHNICAL FIELD

The disclosure relates to additively manufactured, graded composite transition joints. In particular, the disclosure relates to additively manufactured, graded composite transition joints for dissimilar metal weldments. In a further aspect, the disclosure relates to additively manufactured graded composite transition joints for dissimilar metal weldments in advanced ultra-supercritical (A-USC) power plants. Additionally, the disclosure relates to a method of producing an additively manufactured-graded composite transition joint ("AM-GCTJ").

BACKGROUND

Since 2001 and as part of the United States Department of Energy's (DOE) Coal Power Program, National Energy Technology Laboratory (NETL) has launched a research program entitled "Development of Advanced Materials for Ultra-supercritical Boiler Systems," to identify and develop next generation materials in advanced ultra-supercritical (A-USC) boilers, and turbine systems. In these boilers and turbine systems, a target steam temperature and pressure of about 760° C. (1400° F.) and about 35 MPa (5000 psi), respectively, may reduce all emissions including carbon dioxide ($CO_2$), by about 20% or greater compared to some boilers and turbine systems.

A challenge in coal-fired A-USC systems has been in the area of materials and manufacturing technologies. As a critical materials component in the boiler, superheater tubes encounter severe service conditions and should meet stringent requirements with respect to fireside coal-ash corrosion/erosion, steam side oxidation and spallation, creep strength, thermal fatigue strength, and weldability. During a DOE A-USC program, alloys 740H and 282, have been identified as candidates for components for A-USC systems. Therefore, acceptable manufacturing and welding processes, especially for materials in dissimilar metal welds (DMW), are desired for applications and success of these systems.

BRIEF DESCRIPTION

All aspects, examples and features mentioned below can be combined in any technically possible way.

An aspect of the disclosure provides a method for producing an additively manufactured, graded composite transition joint (AM-GCTJ) comprising preparing a grating or lattice pattern from a first alloy A, wherein the grating or lattice pattern includes pores in the grating or lattice pattern; building the grating or lattice pattern from a first end to a second end of the grating or lattice pattern, the grating or lattice pattern having a density being more dense on the first end than the second end, and wherein the grating or lattice pattern gradually reduces the density by at least one of increasing the pore size from the first end to the second end and reducing the density of the grating or lattice pattern as the grating or lattice pattern is additively manufactured; adding a second alloy B powder to the first end of the grating or lattice pattern; filling the second alloy B powder towards the second end the grating or lattice pattern; forming a composite of the first alloy A and the second alloy B powder in the AM-GCTJ; and subjecting the composite to hot isostatic pressing (HIP) to densify the composite, wherein, the second alloy B powder has a graduated concentration from the first end to the second end of the AM-GCTJ.

Another aspect of the disclosure includes any of the preceding aspects, and wherein the preparing includes preparing the grating or lattice pattern by at least one of selective laser melting (SLM) or selective laser sintering (SLS).

Another aspect of the disclosure includes any of the preceding aspects, and wherein the filling includes vibrating the second alloy B to fall from the first end towards the second end of the grating or lattice pattern Another aspect of the disclosure includes any of the preceding aspects, and wherein the preparing includes preparing the grating or lattice pattern by additively building the grating or lattice pattern from the first end to the second end.

Another aspect of the disclosure includes any of the preceding aspects, and wherein the pores have pore size with a diameter in the range from about tens of micrometers to sub millimeters.

Another aspect of the disclosure includes any of the preceding aspects, and wherein the vibrating the second alloy B powder towards the second end the grating or lattice pattern includes ultrasonic vibrating the second alloy B powder.

Another aspect of the disclosure includes any of the preceding aspects, and wherein the second alloy B powder is graduated from about 0% at the second end the grating or lattice pattern to about 100% at the first end of the grating or lattice pattern.

Another aspect of the disclosure includes any of the preceding aspects, and wherein the first alloy A includes an austenitic stainless steel and the second alloy B includes a creep strength enhanced ferritic steel.

Another aspect of the disclosure includes any of the preceding aspects, and wherein the first alloy A includes a creep strength enhanced ferritic steel an austenitic stainless steel and the second alloy B includes an austenitic stainless steel.

Another aspect of the disclosure includes any of the preceding aspects, and wherein the first alloy A includes a creep strength enhanced ferritic steel an austenitic stainless steel and the second alloy B includes a superalloy.

An aspect of the disclosure provides an additively manufactured-graded transition joint (AM-GCTJ) comprising a first alloy A; a second alloy B; a transition joint, wherein a larger concentration of the first alloy A is disposed at a first end of the transition joint and a larger concentration of the second alloy B is disposed at second end of the transition joint; and a gradient composite transition piece disposed between a first end of the transition joint and a second end of the transition joint, wherein the gradient composite transition of the first alloy A and the second alloy B includes a graded transition of the first alloy A and the second alloy B from the first end of the transition joint to the second end of the transition joint.

Another aspect of the disclosure includes any of the preceding aspects, and wherein the first alloy A is configured to be welded at a first end of the transition joint and the second alloy B is configured to be welded at a second end of the transition joint.

Another aspect of the disclosure includes any of the preceding aspects, and wherein the graded transition transitions from the end of the transition joint to the second end of the transition joint is about 0% of the second alloy B at the second end to about 100% the second alloy B at the first end.

Another aspect of the disclosure includes any of the preceding aspects, and wherein the first alloy includes a creep strength enhanced ferritic steel an austenitic stainless steel and the second alloy includes an austenitic stainless steel Another aspect of the disclosure includes any of the preceding aspects, and wherein the first alloy includes a creep strength enhanced ferritic steel an austenitic stainless steel and the second alloy includes a superalloy.

An aspect of the disclosure provides an additively manufactured-graded transition joint (AM-GCTJ) comprising a mixture of a first alloy A and a second alloy B, the first alloy A includes a grating or lattice pattern having a graduated density, the grating or lattice pattern having a first end and second end, and the grating or lattice pattern includes at least one pore, the at least one pore has a pore size diameter in the range from about tens of micrometers to about sub millimeters, and the grating or lattice pattern having a density on the second end that is denser than the grating or lattice pattern at the first end and the density is graduated volumetric ratio from 0% to 100%, by at least one of increasing the pore size from the second end to the first end and reducing the grating or the lattice pattern density as layers are additively built up from the second end to the first end, and wherein the second alloy B is added to the second end of the grating or lattice pattern to form a composite with the grating or lattice pattern, wherein the composite has from 0% alloy B to 100% alloy B in a smooth graded transition from the second end of the AM-GCTJ to the first end of the AM-GCTJ.

Another aspect of the disclosure includes any of the preceding aspects, and wherein the first alloy A includes a creep strength enhanced ferritic steel an austenitic stainless steel and the second alloy B includes an austenitic stainless steel.

Another aspect of the disclosure includes any of the preceding aspects, and wherein the first alloy A includes a creep strength enhanced ferritic steel an austenitic stainless steel and the second alloy B includes a superalloy.

Another aspect of the disclosure includes any of the preceding aspects, and wherein the first alloy A is configured to be welded at a first end of the transition joint and the second alloy B is configured to be welded at a second end of the transition joint.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

DETAILED DESCRIPTION

As an initial matter, in order to clearly describe the subject matter of the current disclosure, it will become necessary to select certain terminology when referring to and describing relevant characteristics, properties, and components within an additively manufactured and graded composite transition joint. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Robust dissimilar metal welds (DMWs) can enable advanced ultra-supercritical (A-USC) systems. Robust DMWs can also be employed in and enable enhancement via refits and renovations of existing A-USC power plants. As renewable energies have become affordable and incorporated into electric grids, the electric power utility industry may need to retrofit and renovate fossil coal and natural gas power plants to operate in a flexible operational mode with renewable energy. A flexible operational mode enables use of intermittent and unstable power generation that may be inherent to renewable energy sources. Under increased cyclic operating conditions in existing fossil fuel power plants, failures at a DMW may occur. Cyclic operation places DMWs in stress conditions. In some cyclic operation, stress conditions may shift from creep dominant stress to thermal creep-fatigue domination. Weakened microstructures at a DMW's fusion or bond line interface can be exposed to high cyclic stresses caused by a coefficient of thermal expansion (CTE) mismatch of two different materials that are fused together at the fusion or bond line. As a result, service life and performance of DMWs may be reduced.

Accordingly, as embodied by the disclosure, functionally gradient composite transition joints are formed by additive manufacturing processes. Additive manufactured dissimilar metal weldments (DMWs), as embodied by the disclosure, can provide gradient composite transition joints. Gradient composite transition joints, as embodied by the disclosure, can meet compositional physical property requirements at DMWs. Compositional physical property requirements, as embodied by the disclosure, include but are not limited to room temperature and high temperature strengths, creep resistance, and corrosion resistance. Further, as embodied by the disclosure, gradient composite transition joints can reduce stress concentrations due to the transition of CTE between both sides of additive manufactured dissimilar metal welds. Accordingly, as embodied by aspects of the disclosure, additive manufactured dissimilar metal weldments will improve the cracking and thermal creep fatigue (TCF) resistances DMWs.

A-USC systems may use superalloys for parts given advantageous compositional physical property requirements. As embodied by the disclosure, superalloys can include, but are not limited to, nickel (Ni) based superalloys, or iron (Fe) based superalloys, or cobalt (Co) based superalloys, or combinations thereof. Further, A-USC materials may include austenitic stainless steel (ASS), creep strength enhanced ferritic steel (CSEFS), alone or possibly combined together or combined with other materials. These materials can be provided at different DMW regions depending on temperature and corrosion resistance requirements of a DMW in the A-USC structure. As a result, DMWs between materials may mitigate differences in CTE adverse effects, and may facilitate design, development, and manufacturing of enhanced A-USCs.

For example, and not intending to limit embodiments of the disclosure in any manner, the average linear CTE for an alloy steel is in a temperature range between about 70° F. to about 1100° F. is on the order of approximately 16.2 W° C. (9 µ/° F.), while austenitic stainless steels are on the order of approximately 34.2 W° C. (19 µ/° F.). A temperature change from room temperature to approximately 595° C. (1100° F.) would generate a thermal strain of approximately 0.1%, resulting in thermal stress in the range of approximately 150 MegaPascals (MPa), which is much higher than the typical amount allowed operational stresses. The thermal stress would be expected to be relaxed over time (in months or years) so it would only play a secondary role compared to the applied stresses in DMW performance under the steady operating condition at approximately 595° C. (1100° F.) (creep dominant), which has been the norm of fossil power plants over the past decades. On the other hand, under thermal cyclic operation conditions, such thermal strains would continue to generate and accumulate before they are relaxed. The considerable thermal strain accumulation and damage may have a larger role under thermal creep fatigue (TCF) associated cyclic operation, possibly leading to the premature failure of DMW. Therefore, the thermal stresses in the DMW joints poses a new challenge to the safe operation of fossil energy plants under the increased cyclic operation mode. Understanding and managing thermal stresses in DMWs for future operation may enhance new installations and life extension of DMWs.

Eliminating compositional changes across the fusion or bond line of a DMW can prevent DMW failures.

In DMWs that include nickel-based fillers, failure through creep and/or creep fatigue cracks have been attributed to morphology of carbides. DMWs, including stainless steel fillers, exhibit failure through creep and/or creep fatigue cracks that may possibly be formed along austenite grain boundaries close to the fusion or bond line boundary.

Embodiments of the disclosure provide a method for producing a gradient (or graded) composite transition joint (GCTJ) part. In one aspect of the embodiments, a GCTJ can be used to connect and join dissimilar metals where the gradient characteristics meet the differing properties, such as differing physical and thermal properties, of metals of components which the GCTJ will connect. In another aspect of the embodiments, GCTJ can cost effectively remedy premature failure of the conventional dissimilar metal welds (DMW) under increased cyclic operating conditions of fossil power plants.

Additively manufactured GCTJs (AM-GCTJ) can be suitable for next generation advanced ultrasupercritial (A-USC) power plants, as embodied by the disclosure. In certain aspects of the embodiments, AM-GCTJs can be provided for enhancement via retrofit or replacement of conventional DMWs in existing fossil power plants. This retrofit or replacement may enable safe and economical operation in cycling modes beyond their original intended design life.

For instance, welding dissimilar metals including Creep Strength Enhanced Ferritic Steels (CSEFS) or Austenitic Stainless Steel (ASS) to superalloys are two types of important DMWs finding possible application in the next generation of A-USC systems.

In one non-limiting illustrative aspect of the embodiments, Austenitic Stainless Steel (ASS) is based on 18% Cr-8% Ni. As embodied by the disclosure, ASS can include, but is not limited to, Super 304H or Sanicro25, and their equivalents.

In another non-limiting aspect of the embodiments, CSEFS, also known as martensitic or super ferritic steels can include but are not limited to, Grades 91 and 92 steels. Additionally, superalloys can include but are not limited to Ni-based, Fe-based, and/or Co-based superalloys.

Additively Manufactured Graded Composite Transition Joints (AM-GCTJ)

Figure 1:
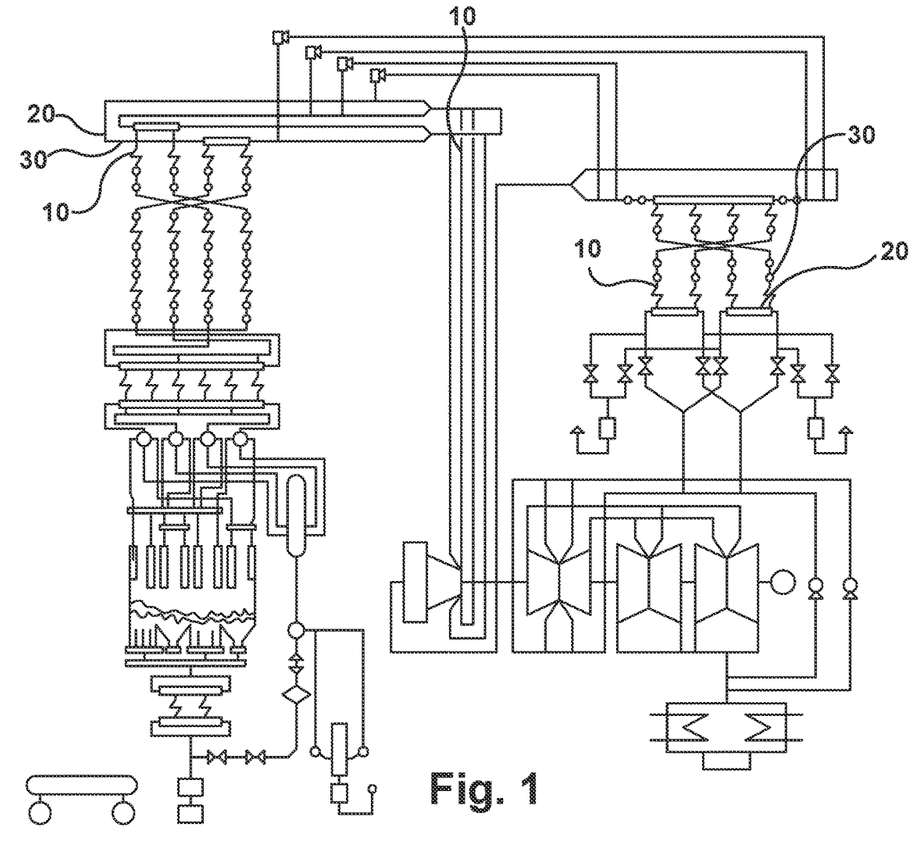
FIG. 1 illustrates a schematic view of an A-USC power plant component, as embodied by the disclosure.
Figure 2:
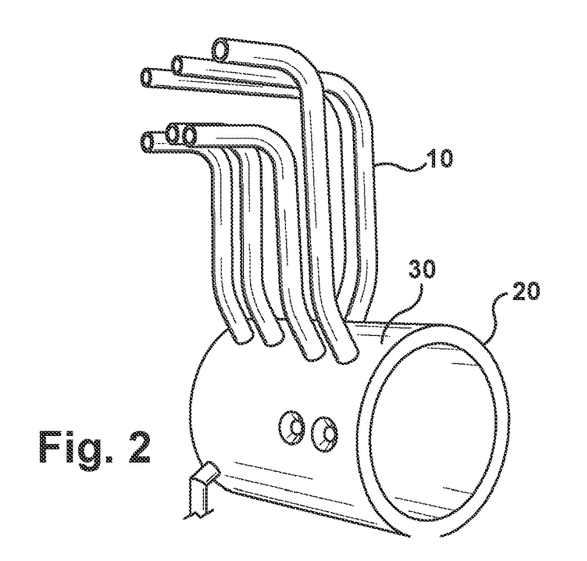
FIG. 2 illustrates a perspective view of an A-USC header, as embodied by the disclosure.

In an A-USC system, a DMW may be provided in the system between features formed from different materials, such as but not limited to, CSEFS (in one aspect of the embodiments, Grade 91/92) and ASS (in one aspect of the embodiments, Super 304H). In FIGS. 1 and 2, a tube 10 is connected to a header 20 at a nipple weld 30 that may be positioned at an inlet of a final stage superheater/reheater. The superheater design condition can be approximately 387 bar/640° C. in a non-limiting embodiment of the disclosure. DMW dimension has an outer diameter (OD) approximately 40 mm and approximately 8 mm thick in a non-limiting embodiment of the disclosure. DMW of ASS (in one aspect of the embodiments, Sanicro25) to Ni-base superalloys (in one aspect of the embodiments, 740H or H0282) may be at a tube 10 to a header 20 at a nipple weld 30 at a final stage superheater/reheater outlet. The superheater design condition may be approximately 387 bar/670° C. DMW dimension may have an outer diameter (OD) approximately 44 millimeters (mm) in OD and approximately 10 mm in thickness.

Potentially undesirable DMW traits may be mitigated through an additively manufactured graded composite transition joints (AM-GCTJ) 300, as embodied by the disclosure. One aspect of an AM-GCTJ 300, as embodied by the disclosure, is illustrated in FIG. 4.

Figure 3A:
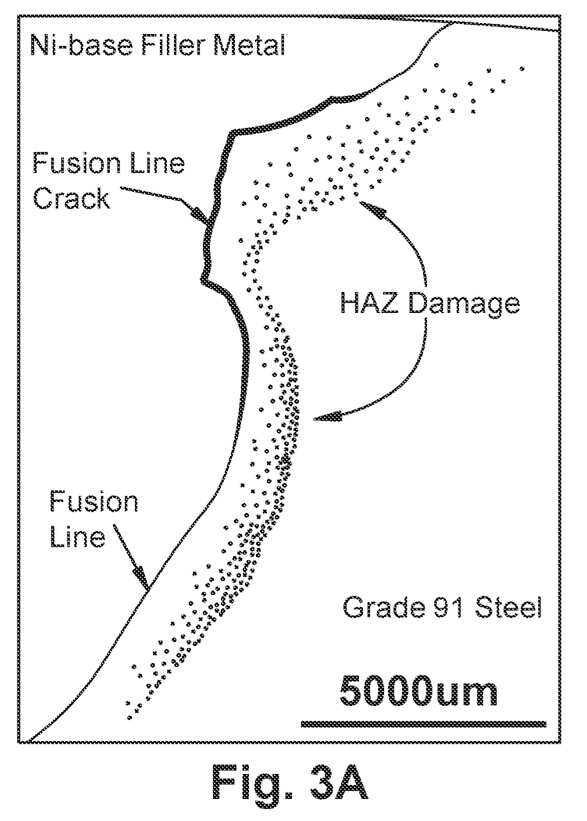
FIG. 3(a) illustrates a schematic view of a fusion or bond line crack and heat affected zone (HAZ) damage of a dissimilar metal weld (DMW), as embodied by the disclosure.
Figure 3B:
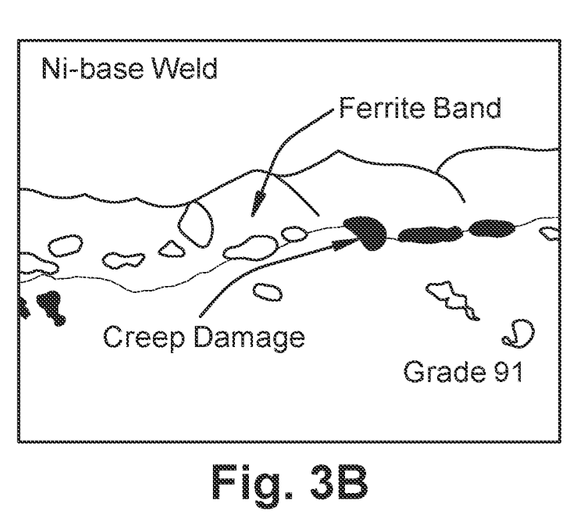
FIG. 3(b) illustrates a microscopic view of local creep damage near the fusion or bond line related to carbon depletion in a DMW, as embodied by the disclosure.

The change in microstructure across a fusion or bond line of DMWs in the as-welded condition may be due to a steep chemical concentration gradient. FIG. 3A illustrates a heat affected zone (HAZ) between Grade 91 steel and a Ni-based filler metal. FIG. 3B illustrates creep and/or creep fatigue crack failures in a DMW fusion or bond line. Creep and/or creep fatigue cracks can occur along the fusion or bond line boundary and HAZ between different alloys of the DMW. Creep and/or creep fatigue cracks can be attributed to, at least one of residual, external, and thermal stresses caused by CTE mismatch. Thermal stresses due to CTE mismatch may be significant. Failure may be accompanied with damages in the HAZ.

Figure 4:
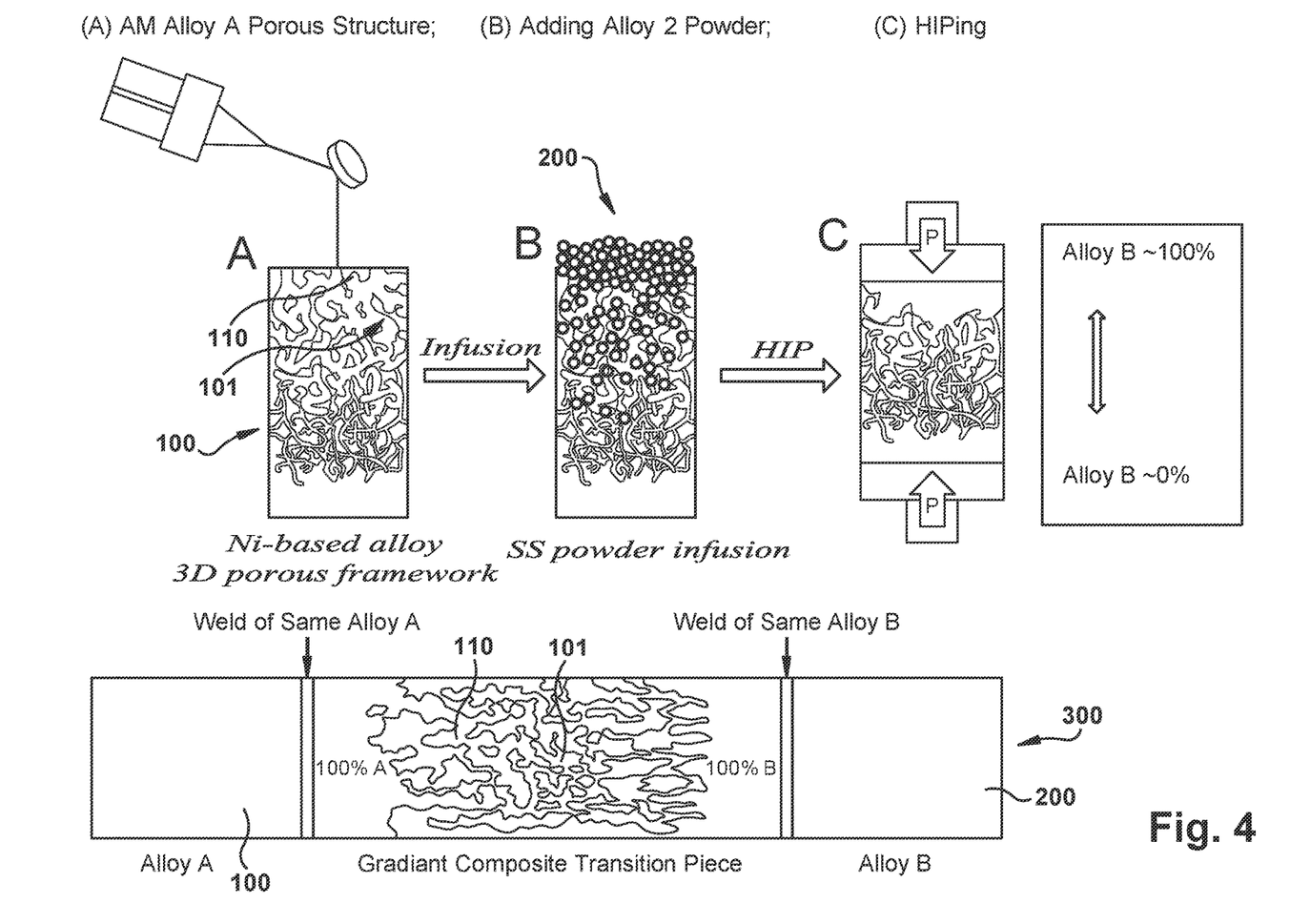
FIG. 4 illustrates schematic flow diagram of a method, as embodied by the disclosure, for additively manufacturing a graded composite transition joint, as embodied by the disclosure.

FIG. 4 illustrates an additive manufacturing process for forming an additively manufactured graded composite transition piece (AM-GCTJ) 300. First, the additively manufactured graded composite transition piece (AM-GCTP) is formed. AM-GCTP 300 includes a first alloy or Alloy A 100 and second alloy or Alloy B 200. The GCTP is formed with a gradual, gradient change in mixture of Alloy A 100 and Alloy B 200 along its structure. The composition of the mixture of Alloy A 100 and Alloy B 200 is 100% Alloy A 100 at a first (one) end to 100% Alloy B 200 at the second (second end) so the area between the ends transitions in a controlled concentration from substantially all Alloy B 200 at first end to all Alloy A 100 at the second end. Alloy A 100 and Alloy B 200 thus constitute a purposely formulated composite that includes a mixture of Alloy A 100 and Alloy B 200. However, the mixture may optionally include other additives in between the ends.

Transition of Alloy A 100 and Alloy B 200 in the composite or more specifically, a ratio or concentration of Alloy A 100 and Alloy B 200 is gradually changed from first end of the AM-GCTP to the second end of the AM-GCTP. The gradual concentration change is provided to mitigate and reduce sharp changes in chemistry and thermal stresses in DMWs, such as but not limited to those by differences in CTEs.

After the AM-GCTP is formed, AM-GCTP may be placed between and welded to the two structural members, such as those shown in FIG. 1 and FIG. 2 to form an AM-GCTJ 300. In certain aspects of the embodiments, AM-GCTJ 300 can be formed between a Ni-based superalloy and CSEFS in the DMW. Similarly, AM-GCTJ 300 can be formed between an ASS and CSEFS in a DMW.

Since ends of the AM-GCTJ 300 have substantially a similar chemistry to the materials of structural members to which the AM-GCTJ is to be welded, the welds connecting AM-GCTJ 300 to the two structural members are essentially made between two materials with matching or compatible chemistry, including but not limited to matching CTEs. This same material welding can eliminate factors causing premature failures of DMWs, such as but not limited to transition of chemistry and CTE mismatch-induced thermal stresses at a DMW fusion or bond line.

Another aspect of the embodiments includes producing AM-GCTP via an additive manufacturing (AM) process to produce the AM-GCTJ 300. As illustrated in FIG. 4A, a first process step includes producing grating or lattice patterns 101 from Alloy A 100. (See also FIG. 8 which illustrates an illustrative and non-limiting grating or lattice patterns 101, as embodied by the disclosure). In an illustrative aspect of the embodiments, Alloy A 100 can include, but is not limited to, ASS. The grating or lattice patterns 101 from Alloy A 100 can be produced with additive manufacturing processes. Such additive manufacturing processes include, but are not limited to, at least one of selective laser melting (SLM) and selective laser sintering (SLS).

The grating or lattice patterns 101 formed from Alloy A 100 include pores 110. Sizes of the pores 110 in grating or lattice patterns 101 can vary. The cross-sectional size of pores 110 can be in a range between about tens of micrometers to about sub millimeters. Grating or lattice patterns 101 can be formed denser on the grating or lattice pattern's first end and less dense at second end of the grating or lattice pattern 101. The density or concentration can be expressed as a volumetric ratio. The density/volumetric ratio gradually reduces the volumetric ratio from about 0% to about 100% in the grating or lattice pattern 101. This gradual reduction in volumetric ratio of the grating or lattice pattern 101 can be achieved by increasing at least one of the pore 110 size and reducing the grating or lattice 101 density as layers are additively manufactured and built towards a top of the grating or lattice patterns 101.

After grating or lattice patterns 101 are formed via an additive manufacturing process, Alloy B 200 powders can be provided in to grating or lattice patterns 101. Alloy B 200 powders include but are not limited to Grade 91 steel powders. The provision of Alloy B 200 powders is at first end of grating or lattice patterns 101, the end with less density of Alloy A 100 (FIG. 4B). Alloy B 200 powders include but are not limited to, steel powders, for example Grade 91 steel powder. After Alloy B 200 powders are added, ultrasonic energy may be applied to the grating or lattice pattern 100 to fill the grating or lattice pattern 100 and Alloy B 200 powder therein, wherein the filling includes vibrating Alloy B 200 powder. The ultrasonic energy ultrasonically vibrates and may cause Alloy B 200 powders to fill by falling (shaking) through pores 110 in the grating or lattice patterns 101 towards the end with highest density of Alloy A 100 of grating or lattice patterns 101.

Next, the grating or lattice patterns with Alloy A 100 and Alloy B 200 may be subjected to hot isostatic pressing (HIP). Hiping (FIG. 4C) is applied to densify Alloy A 100 and Alloy B 200 in grating or lattice patterns 101. Hiping can achieve approximately 100% density of Alloy A 100 and Alloy B 200 with the grating or lattice patterns, and form a composite. After the hiping, a graded composite transition of Alloy A 100 and Alloy B 200 in the grating or lattice patterns is achieved from first end of grating or lattice patterns 101 to the second end of grating or lattice patterns 101. The graded composite transition, as embodied by the disclosure, will be from approximately 0-100% Alloy A 100 to Alloy B 200 from an end to the second end of grating or lattice patterns 101.

Figure 5:
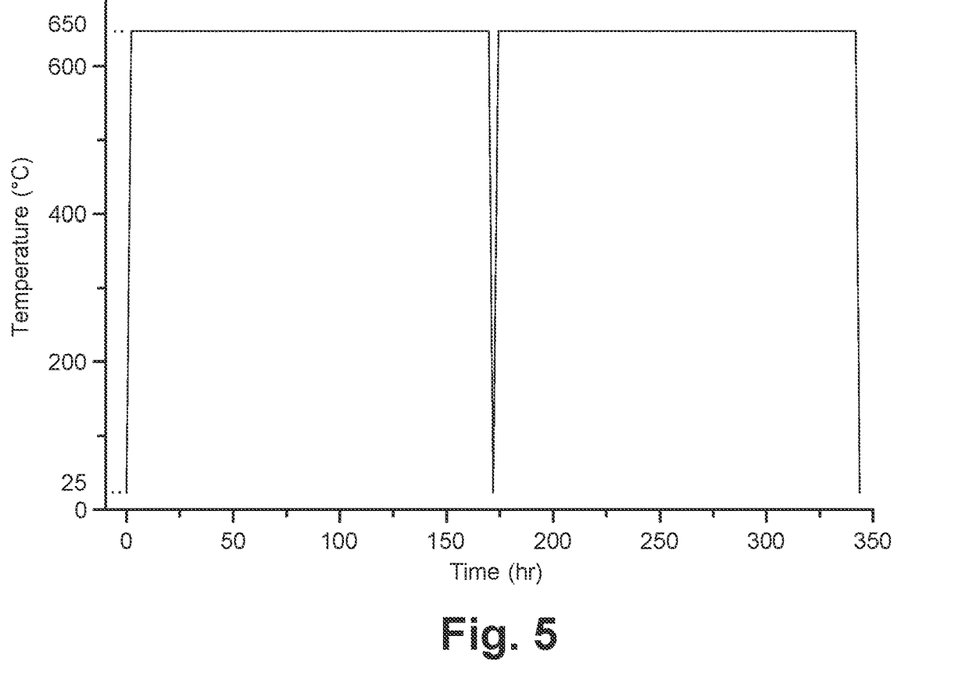
FIG. 5 illustrates a graph of thermal loading cycles adopted in an Integrated Computational Weld Engineering (ICWE) model for transition joint design, as embodied by the disclosure.
Figure 6:
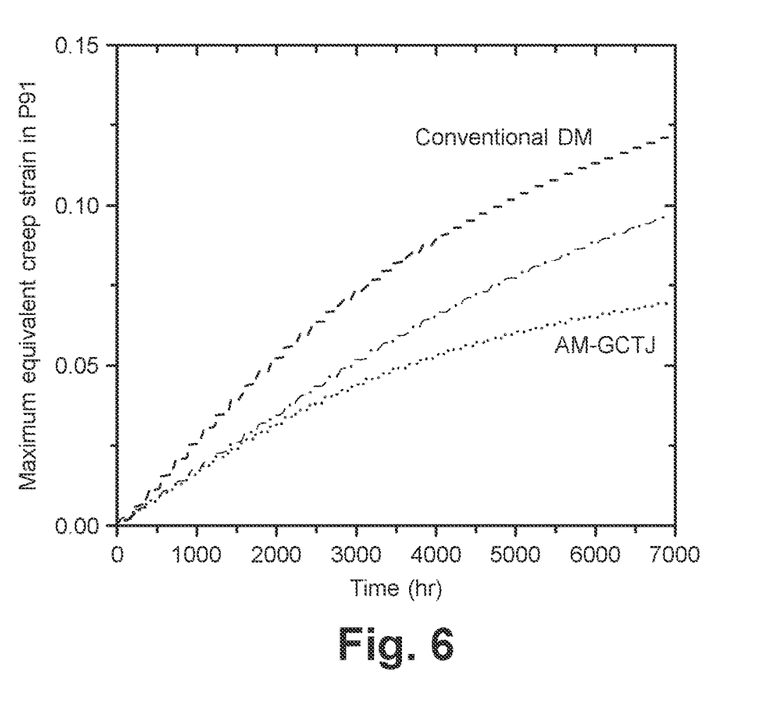
FIG. 6 illustrates a graph of ICWE simulation results of two AM-GCTJ designs between Grade 91 steel and SS 316H DMW, as embodied by the disclosure.
Figure 7:
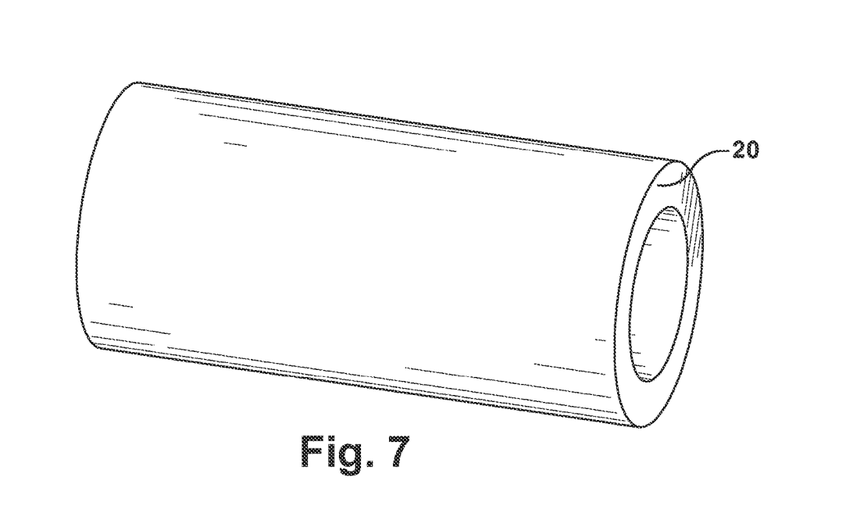
FIG. 7 illustrates a perspective view of use of AM-GCTJ in a header of an A-USC power plant, as embodied by the disclosure.

An Integrated Computational Weld Engineering (ICWE) modeling tool from Oak Ridge National Laboratory (ORNL) can be used to design an AM-GCTJ 300. ICWE can assist in evaluating the thermal stresses caused by thermal cyclic loading in operation conditions of the dissimilar metal welds (DMW). Certain benefits of AM-GCTJ 300 are summarized below with an example. An illustrative, non-limiting application was welding and preparing a piping system with a DMW formed from a Grade 91 steel against a Stainless Steel 316 (See FIG. 5). A straight section of the piping system with DMW to join the two pipes was used, with an outer diameter (OD) of the pipes about 5.1 mm (2 inches), and the pipe thickness was about 0.95 mm (⅜ inches) (dimensions often found in fossil power plants). A thermal cyclic loading profile used in the simulation is illustrated in FIG. 6. The temperature was raised from the ambient temperature to the approximate operating temperature 650° C. in about two hours. The modeling system then held at the operating temperature for 7 days, followed by cooling to the ambient in 2 hours. Such thermal loading cycle modeling was repeated to simulate operation and calculate an accumulative effect of thermal cyclic loading.

Figure 8:
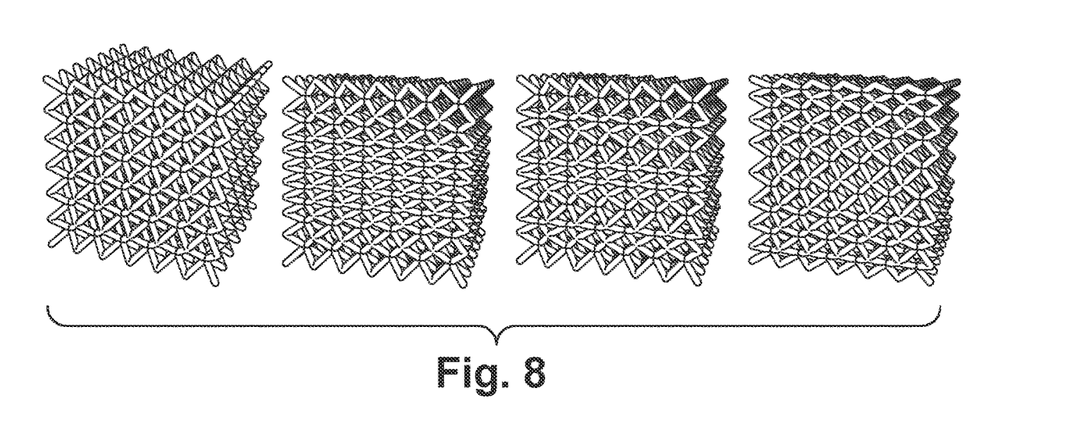
FIG. 8 illustrates a schematic view of various illustrative and non-limiting configurations of grating or lattice patterns, as embodied by the disclosure.

FIG. 8 illustrates an illustrative and non-limiting grating or lattice patterns 101. The lattice of alloy A 100 and the pores 101 can be provided in any configuration, size, cross-section, and dimensions, with the density and pore size provided as embodied by the disclosure. Therefore, as long as the density is more dense on the first end than the second end of the grating or lattice pattern (101) and the density is gradually reduced by at least one of increasing the pore size from the first end to the second end and reducing the density of the grating or lattice pattern (101) as the grating or lattice pattern (101) is additively manufactured, the configuration, size, cross-section, and dimensions of the grating or lattice of alloy A 100 and the pores 101 may vary.

It is noted that graded transition joints (GTJs) can be produced with a variety of manufacturing techniques that are readily scalable for mass fabrication. Compared with the conventional GTJ technologies, the AM-GCTJ 300 approach as embodied by the disclosure, has several technical effects:

AM-GCTJ 300, as embodied by the disclosure, produces composites that preserve the features, such as thermal and physical characteristics, of Alloy A 100 and Alloy B 200. Conventional GTJ technologies, either using wire or powders, melt both Alloy A 100 and Alloy B 200 together to build a transition joint layer-by-layer. Melting and mixing the two different alloys in different ratios is time and resource intensive, and may create a complex and irregular microstructure, which may have unpredictable microstructure and thus unknown or unpredictable properties, such as thermal and physical characteristics. As an example of such an unpredictable microstructure, melting a 50/50 ratio of Grade 91 and 304H would create a "new" material with unproven microstructure stability and high temperature performance, as well as potential solidification defect issues.

Further, as embodied by the disclosure, Alloys A and Alloy B 200 are not melted together compared to a traditional weld operation. In accordance with the disclosure, Alloy A 100 and Alloy B 200 are bonded together through the solid-state HIP process. The solid-state HIP process (hiping) forms a "composite" material of Alloy A 100 and Alloy B 200. Accordingly, the hip'ed composite material of Alloy A 100 and Alloy B 200 does not introduce metallurgical complications of a melted "new" A+B alloy.

After suitable heat treatment, AM-GCTJ 300 can be used as the intermediate connection between two structural members that include properties similar to Alloy A 100 and Alloy B 200. If needed, fusion welding can be provided at both ends of a DMW. Thus, fusion welding can be applied at interfaces, or fusion or bond lines between two structural members that include properties similar to Alloy A 100 and Alloy B 200, which will eliminate previous issues encountered with DMW at fusion or bond lines, such as differing CTEs.

A further technical effect, as embodied by the disclosure, provides a smooth transition between Alloy A 100 and Alloy B 200. The smooth transition is graded and should reduce and mitigate issues related to CTE mismatch. Reduced CTE mismatching may improve turbomachine component life including during cycling operation(s).

Another technical effect of the instant embodiments is that the process and weld can provide enhanced control of DMW compositions. Further, as embodied by the disclosure, the process, including additively manufacturing gratings and lattice patterns 101 can enable differing DMW geometry, which may not be feasible with other welding processes. Accordingly, as embodied by the disclosure, scale-up issues may be reduced in the manufacture of the large quantities of GTJs needed for A-USC systems. Moreover, life extension for existing fleets may be realized with the AM-GCTJ 300 embodiments herein.

The present embodiments provide an additively manufactured, graded composite transition joint for dissimilar metal weldments in advanced ultra-supercritical power plants. In another embodiment of this disclosure, a method is provided for producing an additive manufactured-graded composite transition joint ("AM-GCTJ 300").

It will be appreciated that the above described invention is described with respect to an advanced ultrasupercritical (A-USC) power plant and related alloys. However, it is an aspect of the disclosure that the concepts and embodiments may be used in other dissimilar metal welds (DMWs). Moreover, it is a further aspect of the disclosure that the concepts and embodiments may be used in other applications or industries other than power plants.

It will be apparent to those persons skilled in the art that numerous modifications and variations of the described examples and embodiments set forth herein are possible in light of the above teachings of this disclosure. The disclosed examples and embodiments are presented for purposes of illustration only. Other alternate embodiments may include some or all of the features disclosed herein. Therefore, it is the intent to cover all such modifications and alternate embodiments as may come within the scope of this invention.

Additionally, the disclosure of a range of values is a disclosure of every numerical value within the range, including end points.

It will be appreciated by those persons skilled in the art that changes could be made to embodiments of the present invention described herein without departing from the broad inventive concept thereof. It is understood, therefore, that this invention is not limited by any particular embodiments disclosed, but is intended to cover the modifications that are within the spirit and scope of the invention, as defined by the appended claims.

What is claimed is:

1. A method for producing an additively manufactured, graded composite transition joint (AM-GCTJ), the method comprising:
   preparing a grating or lattice pattern from a first alloy A, wherein the grating or lattice pattern includes pores in the grating or lattice pattern;
   building the grating or lattice pattern from a first end to a second end of the grating or lattice pattern, the grating or lattice pattern having a density being more dense on the first end than the second end, and wherein the grating or lattice pattern gradually reduces the density by at least one of increasing the pore size from the first end to the second end or reducing the density of the grating or lattice pattern as the grating or lattice pattern is additively manufactured;
   adding a second alloy B powder to the grating or lattice pattern
   from the first end towards the second end of the grating or lattice pattern;
   forming a composite of the first alloy A and the second alloy B powder in the AM-GCTJ; and
   subjecting the composite to hot isostatic pressing (HIP) to densify the composite, wherein, the second alloy B powder has a graduated concentration from the first end to the second end of the AM-GCTJ.

2. The method of claim 1, wherein the preparing includes preparing the grating or lattice pattern by at least one of selective laser melting (SLM) or selective laser sintering (SLS).

3. The method of claim 1, wherein the adding includes vibrating the second alloy B to fall from the second end towards the first end of the grating or lattice pattern.

4. The method of claim 1, wherein the preparing includes preparing the grating or lattice pattern by additively building the grating or lattice pattern from the first end to the second end.

5. The method of claim 1, wherein the pores have a pore size with a diameter in the range from about tens of micrometers to about hundreds of micrometers.

6. The method of claim 3, wherein the vibrating the second alloy B powder towards the first end of the grating or lattice pattern includes ultrasonic vibrating the second alloy B powder.

7. The method of claim 1, wherein the second alloy B powder is graduated from a concentration of about 0% at the first end of the grating or lattice pattern to about 100% at the second end of the grating or lattice pattern.

8. The method of claim 1, wherein the first alloy A includes an austenitic stainless steel and the second alloy B includes a creep strength enhanced ferritic steel.

9. The method of claim 1, wherein the first alloy A includes a creep strength enhanced ferritic steel and the second alloy B includes an austenitic stainless steel.

10. The method of claim 1, wherein the first alloy A includes a creep strength enhanced ferritic steel and the second alloy B includes a superalloy.

11. An additively manufactured, graded transition joint (AM-GCTJ), comprising:
    a first alloy A;
    a second alloy B;
    a transition joint, wherein a larger concentration of the first alloy A is disposed at a first end of the transition joint, which also has a lower concentration of the second alloy B, and a larger concentration of the second alloy B is disposed at a second end of the transition joint, which also has a lower concentration of the first alloy A; and
    a gradient composite transition of the first alloy A and the second alloy B is disposed between the first end of the transition joint and the second end of the transition joint, wherein the gradient composite transition of the first alloy A and the second alloy B includes a graded transition of the first alloy A and the second alloy B from the first end of the transition joint to the second end of the transition joint, and wherein the gradient composite transition includes a grating or lattice pattern of the first alloy A that includes pores with a size that increases from the first end of the transition joint to the second end of the transition joint.

12. The additively manufactured-graded transition joint (AM-GCTJ) of claim 11, wherein the first alloy A is configured to be welded at the first end of the transition joint and the second alloy B is configured to be welded at the second end of the transition joint.

13. The additively manufactured-graded transition joint (AM-GCTJ) of claim 11, wherein the graded transition from the first end of the transition joint to the second end of the transition joint is about 0% of the second alloy B at the first end to about 100% of the second alloy B at the second end.

14. The additively manufactured-graded transition joint (AM-GCTJ) of claim 11, wherein the first alloy A includes a creep strength enhanced ferritic steel and the second alloy B includes an austenitic stainless steel.

15. The additively manufactured-graded transition joint (AM-GCTJ) of claim 11, wherein the first alloy A includes a creep strength enhanced ferritic steel and the second alloy B includes a superalloy.

16. An additively manufactured, graded transition joint (AM-GCTJ), comprising:
    a mixture of a first alloy A and a second alloy B;
    the first alloy A includes a grating or lattice pattern having a graduated density of the first alloy A, the grating or lattice pattern having a first end and a second end, and the grating or lattice pattern includes at least one pore, the at least one pore has a pore size diameter in a range from between about tens of micrometers to about hundreds of micrometers; and
    the grating or lattice pattern having a density of the first alloy A on the second end that is denser than the the density of the first alloy A at the first end, and the density has a graduated volumetric ratio from 0% to 100% by at least one of increasing the pore size from the second end to the first end or reducing the grating or the lattice pattern density as layers are additively built up from the second end towards the first end, and wherein the second alloy B is added to the grating or lattice pattern to form a composite with the grating or lattice pattern, wherein the composite has a concentration of the second alloy B from about 0% of the second alloy B at the second end to about 100% of the second alloy B at the first end of the AM-GCTJ.

17. The additively manufactured-graded transition joint (AM-GCTJ) of claim 16, wherein the first alloy A includes a creep strength enhanced ferritic steel and the second alloy B includes an austenitic stainless steel.

18. The additively manufactured-graded transition joint (AM-GCTJ) of claim 16, wherein the first alloy A includes a creep strength enhanced ferritic steel and the second alloy B includes a superalloy.

19. The additively manufactured-graded transition joint (AM-GCTJ) of claim 16, wherein the first alloy A is configured to be welded at a first transition joint end and the second alloy B is configured to welded at a second transition joint end.

* * * * *